(12) United States Patent
Norton et al.

(10) Patent No.: US 7,701,946 B1
(45) Date of Patent: Apr. 20, 2010

(54) MECHANISM FOR DATA AND EVENT MANAGEMENT ACROSS NETWORKS

(75) Inventors: Derk D. Norton, Louisville, CO (US); William F. Meine, Denver, CO (US)

(73) Assignee: Oracle America, Inc., Redwood Shore, CA (US)

(*) Notice: Subject to any disclaimer, the term of this patent is extended or adjusted under 35 U.S.C. 154(b) by 469 days.

(21) Appl. No.: 11/499,157

(22) Filed: Aug. 3, 2006

(51) Int. Cl.
  *H04L 12/28* (2006.01)
  *H04L 12/56* (2006.01)
  *G06F 15/16* (2006.01)

(52) U.S. Cl. ............... 370/395.2; 370/395.7; 370/400; 709/227; 709/245

(58) Field of Classification Search ............ 370/252
  See application file for complete search history.

(56) References Cited

U.S. PATENT DOCUMENTS

| | | | | |
|---|---|---|---|---|
| 4,985,889 A | * | 1/1991 | Frankish et al. ......... 370/395.3 |
| 7,457,257 B2 | * | 11/2008 | Tang et al. ................. 370/256 |
| 2003/0055892 A1 | * | 3/2003 | Huitema et al. ............. 709/204 |

OTHER PUBLICATIONS

Henk L. Muller et al., "The Data Diffusion Machine with a Scalable Point-to-Point Network", University of Bristol, Computer Science Department, Oct. 1993.*
U.S. Appl. No. 11/499,159, Norton et al.
U.S. Appl. No. 11/499,158, Norton et al.

* cited by examiner

*Primary Examiner*—Daniel J Ryman
*Assistant Examiner*—Cassandra Decker
(74) *Attorney, Agent, or Firm*—Brooks Kushman P.C.

(57) ABSTRACT

In one embodiment, a method and apparatus for a mechanism for data and event management across networks is disclosed. The method includes creating one or more random connections to transmit event data between agents in a data management network, the agents to maintain the event data for the data management network without utilizing a central management system, randomly removing one of the random connections, and forming another random connection between the agents. Other embodiments are also disclosed.

14 Claims, 10 Drawing Sheets

US 7,701,946 B1

MECHANISM FOR DATA AND EVENT MANAGEMENT ACROSS NETWORKS

FIELD OF INVENTION

An embodiment of the invention relates to network management, and more specifically, to a mechanism for data and event management across networks.

BACKGROUND OF INVENTION

Data and event management networks provide an approach to remotely monitor and maintain many remote systems gathered under an organization. These remote systems may generate multiple events (e.g., hardware and software management events, application metrics, etc.) These events may produce indicators known as telemetry data. For example, telemetry data may include indicators that CPU utilization has dropped below a threshold, a file system is full, or a component has failed. This telemetry data may be utilized by the data and event management network to act on the remote systems to address the events. For instance, typical responses may include shutting down a remote system, triggering log file archiving, or scheduling a card replacement request, to name a few examples.

The transmission and management of system telemetry data for an organization's multitude of customer systems is a difficult problem. Current approaches to this problem utilize a traditional centralized event management architecture. This centralized event management architecture may have many global data centers that funnel their data through an event consolidation center to be analyzed and managed at various management consoles.

In such a system with a centralized event management structure, all systems events must be funneled through a central location. This central location acts as a bottleneck to the system events. The central location is also a single point-of-failure. Furthermore, replicating this central location can be prohibitively expensive. A problem with this traditional approach is that it cannot scale to handle millions of systems due to these central bottlenecks, single points-of-failure, and expense in replicating.

Furthermore, today's network environments are increasing in complexity at a geometric rate. The traditional centralized management structure tends to grow at a linear rate. This leads to a problem that eventually a critical point will be reached where the complexity of the managed network environment exceeds its manageability. As a result, under a centralized approach, increased complexity leads to increased system management costs. Furthermore, human intervention is much more expensive than automated responses. Human and system management resources cannot grow geometrically and, in many cases, the human resource allocation is shrinking. This results in a manageability gap.

A system that achieves global system event monitoring and management in a way that scales to handle a very large number of systems in a cost-effective manner and that is highly resilient to changes and failures in the global environment would be beneficial.

SUMMARY OF INVENTION

The present invention includes novel methods and apparatus for a mechanism for data and event management across networks.

According to one embodiment of the invention, a method is disclosed. The method includes creating one or more random connections to transmit event data between agents in a data management network, the agents to maintain the event data for the data management network without utilizing a central management system, randomly removing one of the random connections, and forming another random connection between the agents.

According to another embodiment of the invention, an apparatus is disclosed. The apparatus includes a local cache and a data diffusion engine coupled to the local cache. The data diffusion engine is further to create one or more random connections to transmit event data between the apparatus and agents in a data management network, the apparatus and the agents to maintain the event data for the data management network without utilizing a central management system, randomly remove one of the random connections, and form another random connection between the apparatus and the agents.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
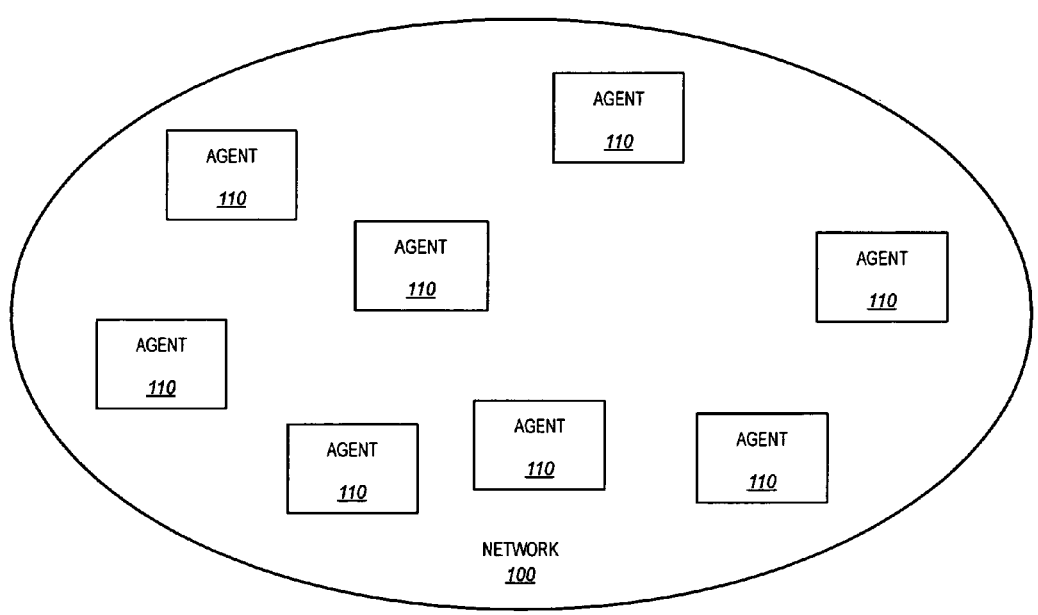
FIG. 1 is a block diagram of an exemplary network to apply a data and event management system of embodiments of the invention.

A method and apparatus are described for a mechanism for data and event management across networks. According to one embodiment, the method includes creating one or more random connections to transmit event data between agents in a data management network, the agents to maintain the event data for the data management network without utilizing a central management system, randomly removing one of the random connections, and forming another random connection between the agents.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Embodiments of the invention introduce a novel mechanism for data and event management across networks. This mechanism provides a solution to the scalability problem previously mentioned by modeling a data and event management network as a large network of simple agents, where each agent is responsible for generating the event data for the system on which it runs. As used herein, event data may include any data defining an event, measurement, or telemetry data associated with components of a data and event management network.

The agents interact with each other in random ways that cause copies of the event data to quickly "diffuse" through the network. As new event data is injected into the data diffusion network, older event data "evaporates" away ensuring that the network contains primarily recent event data. The data diffusion network technology also adds another mechanism that allows agents that are interested in specific event data to cause copies of that event data to "migrate" from other areas in the network toward the interested agent.

Overall Data Diffusion Network Architecture

FIG. 1 is a block diagram illustrating an exemplary network to apply a data and event management system of embodiments of the invention. Network 100 includes multiple system nodes 110 that are communicatively coupled. The system nodes 110, also known as agents 110, may include any client system, such as a data center or a computing station.

In prior systems, one of the agents 110 may have been, for example, a system of a central organization of the network 100. Under such a prior art organization, any event data produced from agents 110 would have been funneled to the system node for analysis and event management.

In comparison, embodiments of the present invention create random (in some embodiments, unidirectional) connections between the agents 110 in the network 100. Each agent 110 may be a component that is monitored by a data and event management network of embodiments of the invention.

Figure 2:
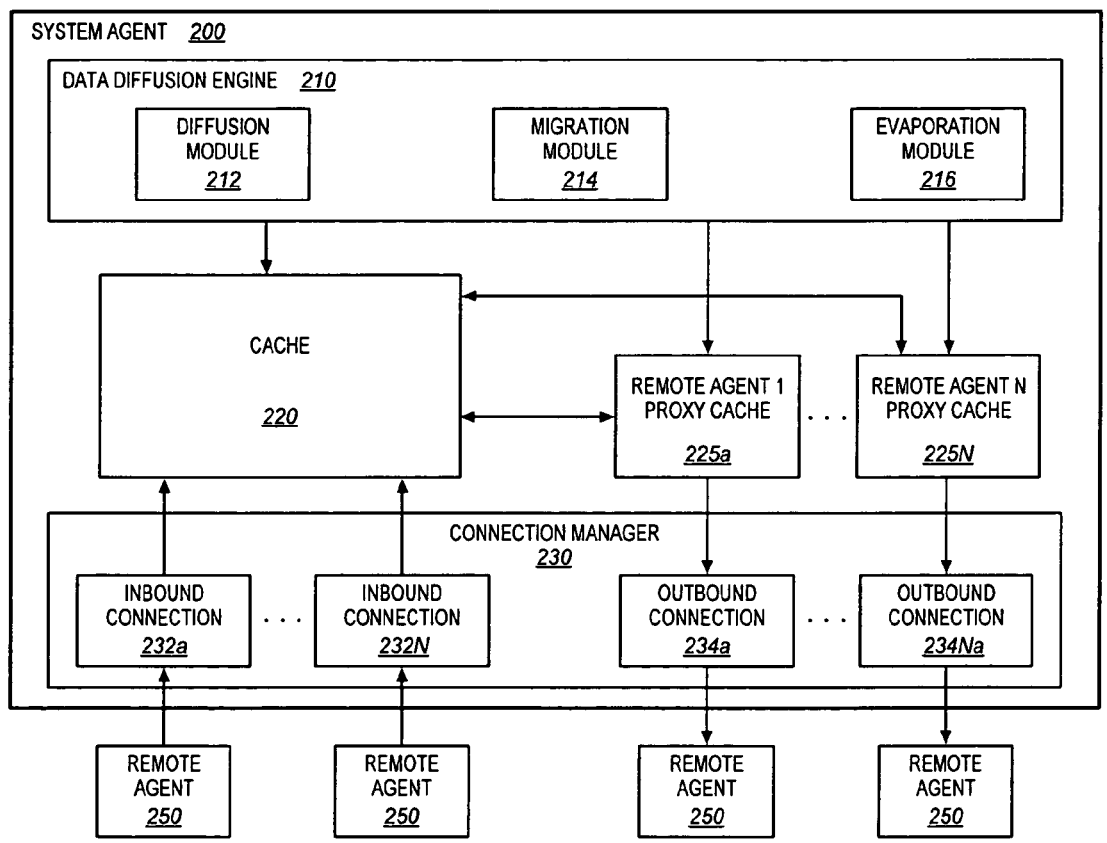
FIG. 2 is a block diagram illustrating an exemplary agent of a data and event management network of embodiments of the invention.

FIG. 2 is a block diagram of an exemplary agent of the data and event management network of embodiments of the invention. In one embodiment, agent 200 is the same as agents 110 described with respect to FIG. 1. Agent 200 includes a data diffusion engine 210, a local cache 220, remote proxy caches 225a-2215N, and a communication manager 230.

The data diffusion engine 210 includes a diffusion module 212, a migration module 214, and an evaporation module 216. The modules 212, 214, 216 of the data diffusion engine allow the agent 200 to perform various processes, such as diffusion, evaporation, and migration of event data. These processes will be described in greater detail in the description further below.

Agent 200 maintains a local cache 220 to store a subset of the event data that is diffusing through the data and event management network. Agent 200 further maintains remote agent proxy caches 225a-225N to optimize transfers between it and other agents to which agent 200 is connected.

The communication manager 230 includes inbound connections 232a-232N and outbound connections 234a-234N. The communication manager 230 is responsible for accepting inbound connection requests from remote agents, as well as initiating outbound connection requests to random agents. It is also responsible for periodically terminating outbound connections and then reconnecting with a new random remote agent. In one embodiment, inbound connections 232a-232N and outbound connections 234a-234N are the physical links between other agents in the network to which agent 200 is communicatively coupled to perform the different processes of the data diffusion engine 210.

Agent 200 interacts with the other connected agents in random ways that cause copies of its event data to quickly "diffuse" through the data and event management network (e.g., network 100 described with respect to FIG. 1). As new event data is injected into the network by agent 200, older event data "evaporates" away ensuring that the network contains primarily recent event data. Furthermore, if agent 200 is interested in obtaining specific event data from the data and event management network, it may inject a template into its local cache that cause copies of matching event data to "migrate" from other remote agents in the network toward agent 200.

Agent 200 relies on its connections to other agents in order to diffuse, evaporate, and migrate event data. Accordingly, agent 200 utilizes the communication manager 230 to randomly form, tear down, and reform its connections with other remote agents via a connection churning process. This connection churning process of the communication manager 230 relies on address information of other remote agents stored in the local cache 220 of agent 200 to form, tear down, and reform its connections. In some embodiments, this address information is treated the same way as regular data by agent 200.

Figure 3:
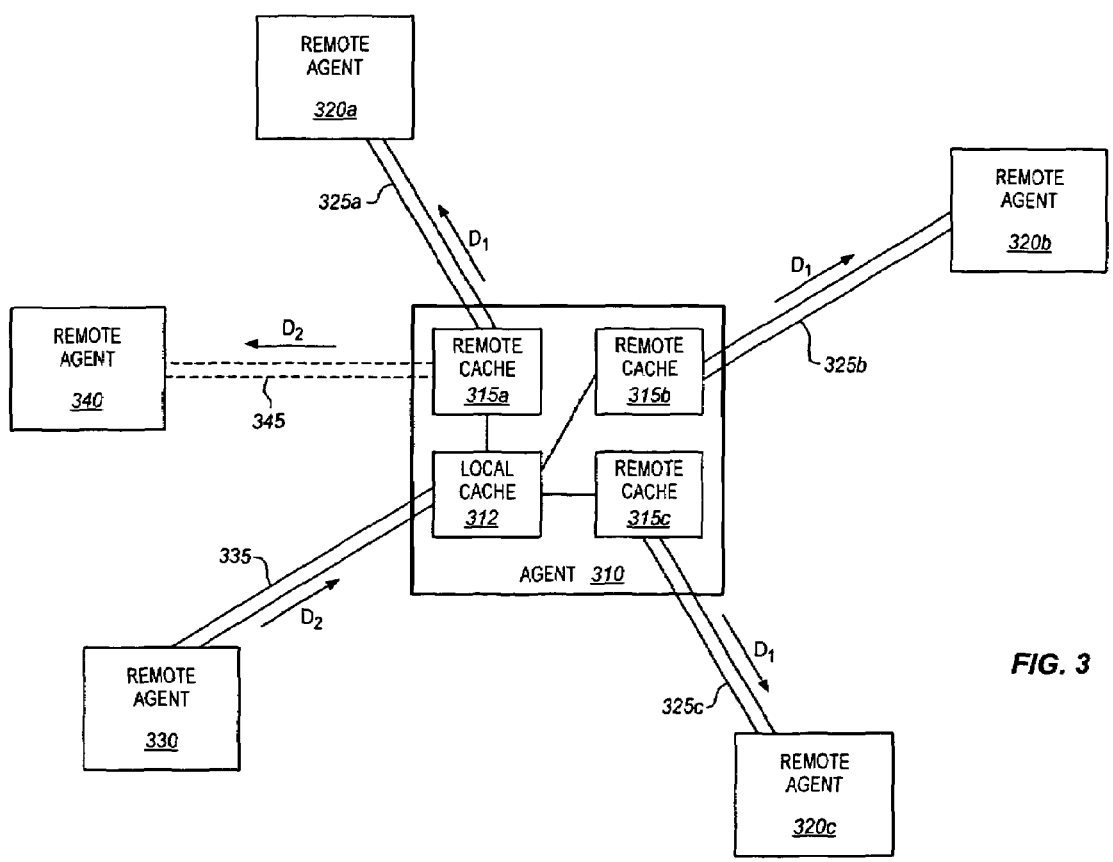
FIG. 3 is a block diagram illustrating exemplary random connections between agents of a data and event management network of embodiments of the invention.

FIG. 3 is a block diagram illustrating exemplary random connections between agents of a data and event management network of embodiments of the invention. System 300 includes multiple agents 310, 320a-c, 330, 340. In one embodiment, these agents 310, 320a-c, 330, 340 are the same as agents 110 and 200 described with respect to FIGS. 1 and 2. For instance, agent 310 includes a local cache 312 and multiple remote caches 315*a-c*, similar to agent 200 described with respect to FIG. 2.

In one embodiment, agent 310 may have multiple connections to other agents. As illustrated, agent 310 is randomly connected to remote agents 320*a*, 320*b*, and 320*c*. Remote cache 315*a* is used for the connection 325*a* to remote agent 320*a*, remote cache 315*b* is used for the connection 325*b* to remote agent 320*b*, and remote cache 315*c* is used for the connection 325*c* to remote agent 320*c*. The connections 325*a-c* between agent 310 and the other remote agents 320*a-c* may be established via a connection churning process.

In some embodiments, connections 325*a-c* are unidirectional connections, so that event data from remote caches 315*a-c* only travels from agent 310 towards remote agents 320*a-c*. In other embodiments, the connections 325*a-c* may be bidirectional. Remote cache 315*a-c* may obtain event data from local cache 312 to temporarily store until the time to transfer the event data via connections 325*a-c* to the connected remote agents 320*a-c*.

In one embodiment, other remote agents may also create connections to agent 310. For example, remote agent 330 may have a connection from its remote cache not shown) to the local cache 312 of agent 310. In some embodiments, this connection 335 may be a unidirectional connection from remote agent 330 to agent 310. Remote agent 330 may then supply event data from its cache to the local cache 312 of agent 310. In other embodiments, the connection 335 between remote agent 330 and agent 310 may be bidirectional.

In some embodiments, one or more of the connection 325*a-c* may be broken or removed and another connection 345 may be established or reformed between agent 310 and another remote agent 340. Event data from the local cache 312 of agent 310 may be placed in a remote cache 315*a* and transferred to a cache (not shown) of the newly connected remote agent 340.

Figure 4:
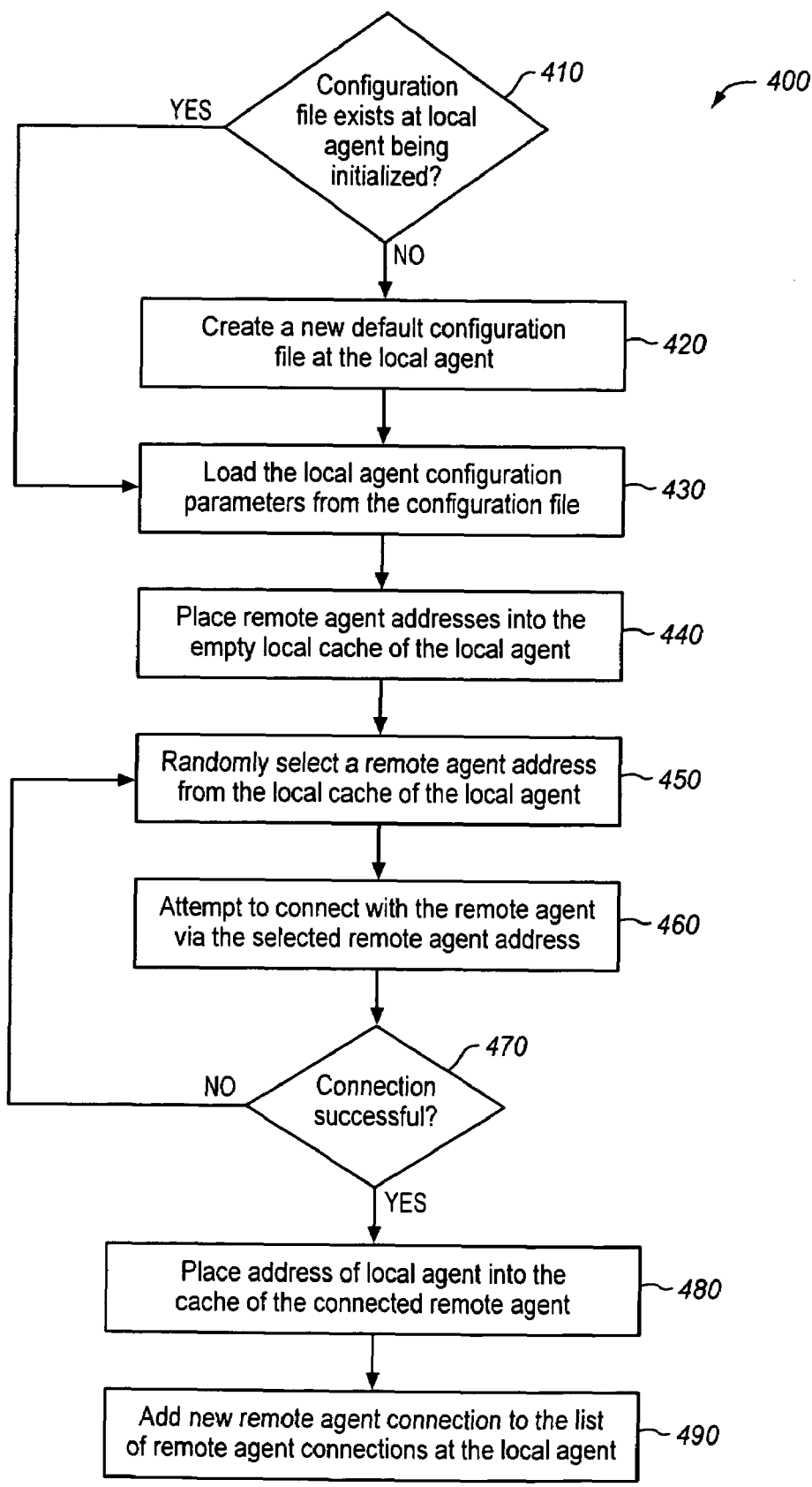
FIG. 4 is a flow diagram depicting a method of agent initialization according to one embodiment of the invention.

FIG. 4 is a flow diagram depicting a method of one embodiment of the invention. Process 400 is a method to initialize connections between agents in a data and event management network of embodiments of the invention. In one embodiment, process 400 is performed by either of agent 110 or 200 described with respect to FIG. 1 or 2.

Process 400 begins at decision block 410, where it is determined whether a configuration file exists at a local agents being initialized. If so, then the process proceeds to processing block 420, which is discussed further below. If not, then, at processing block 430, a new default configuration file is created at the local agent. In one embodiment, this default configuration file may seed the local agent with address information of five well-known agents in the data and event management network, for example. One skilled in the art will appreciate that the number of seed agents could be any number greater than zero. In general, seeding with five initial agents provides enough redundancy to avoid network fragmentation.

At processing block 440, remote agent address information from the configuration file is placed into an empty local cache of the local agent. Then, at processing block 450, a remote agent address is randomly selected from the local cache. At processing block 460, the local agent attempts to connect with the remote agent via the selected remote agent address.

At decision block 470, it is determined whether the connection was successful. If not, then the process returns to processing block 450 where another address for the local agent to connect to is retrieved. On the other hand, if the connection was successful, then the process continues to processing block 480, where the address information of the local agent is placed in a local cache of the remote agent. Finally, at processing block 490, the local agent adds the remote agent connection to a list of remote agent connections stored at the local agent.

Figure 5:
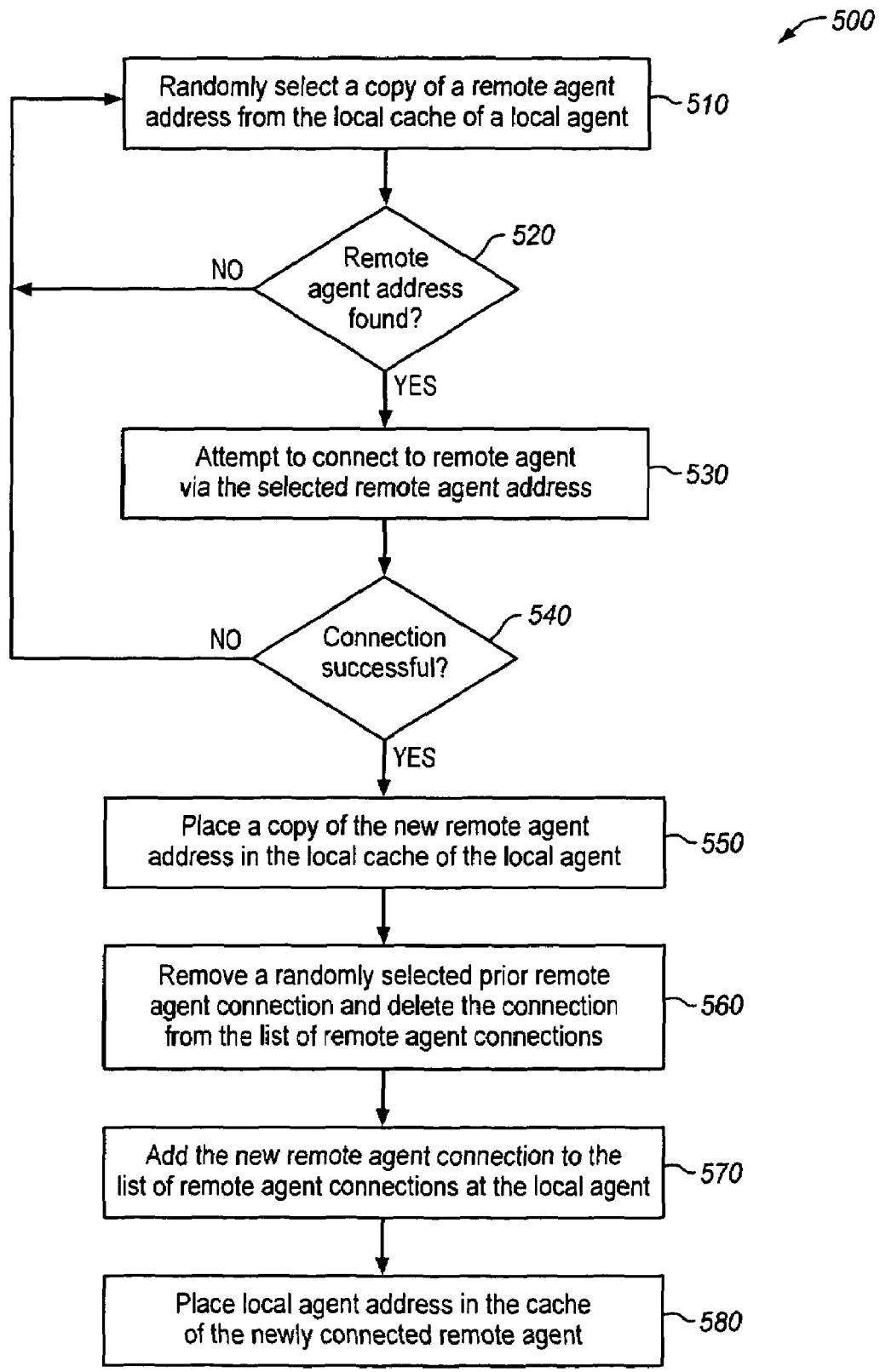
FIG. 5 is a flow diagram depicting a method of connection churning at an agent according to one embodiment of the invention.

FIG. 5 is a flow diagram depicting a method of one embodiment of the invention. Process 500 is a method to churn connections between agents in a data management network of embodiments of the invention. In one embodiment, process 500 is performed by agent 110 or 200 described with respect to FIG. 1 or 2. More specifically, in one embodiment, process 500 is performed by connection manager 230 described with respect to FIG. 2.

Process 500 begins at processing block 510, where a local agent randomly selects a copy of a remote agent address from its local cache. At decision block 520, it is determined whether any addresses were found. If not, the local agent reiteratively continues searching its local cache at processing blocks 510 and 520 until an address is found.

If an address is found successfully at decision block 520, then the local agent attempts to connect to the remote agent via the address at processing block 530. At decision block 540, it is determined whether the connection is successful. If not, then the process returns to processing block 510 to select another address from the local cache.

If the connection is successful, then a copy of the new remote agent address is placed in the local cache of the local agent at processing block 550. Then, at processing block 560, a randomly selected connection that already exists between the local agent and another remote agent is removed from the list of remote agent connections. At processing block 570, the newly selected remote agent connection is added to the list of remote agent connections. At processing block 580, the address of the local agent is placed into a local cache of the newly connected remote agent.

Embodiments of the data and event management network provide a novel mechanism that allows very large scale data and event management networks (of hundreds of thousands of systems or more) to be formed and managed in a cost effective way. System event data is a good example of the type of data that may benefit from the management mechanism of embodiments of the invention. In addition, massive large-scale networks like radio frequency identification (RFID) tags and "smart dust" type applications may be ideally suited for the embodiments of the data and event management network described herein.

An advantage to the data and event management network approach of embodiments of the invention is that there is no centralized data/event collection point to act as a bottleneck or single-point of failure. The systems involved in the data and event management network of embodiments of the invention are the systems that are being managed, so that as a result the management costs scale linearly.

Data Diffusion and Evaporation

In some embodiments, agents of the overall system architecture for the data and event management network described above interact with the other connected agents in random ways that cause copies of their event data to quickly "diffuse" through the network. This event data is transmitted to the other agents via the random connections created by each agent according to the above-described processes.

Figure 6:
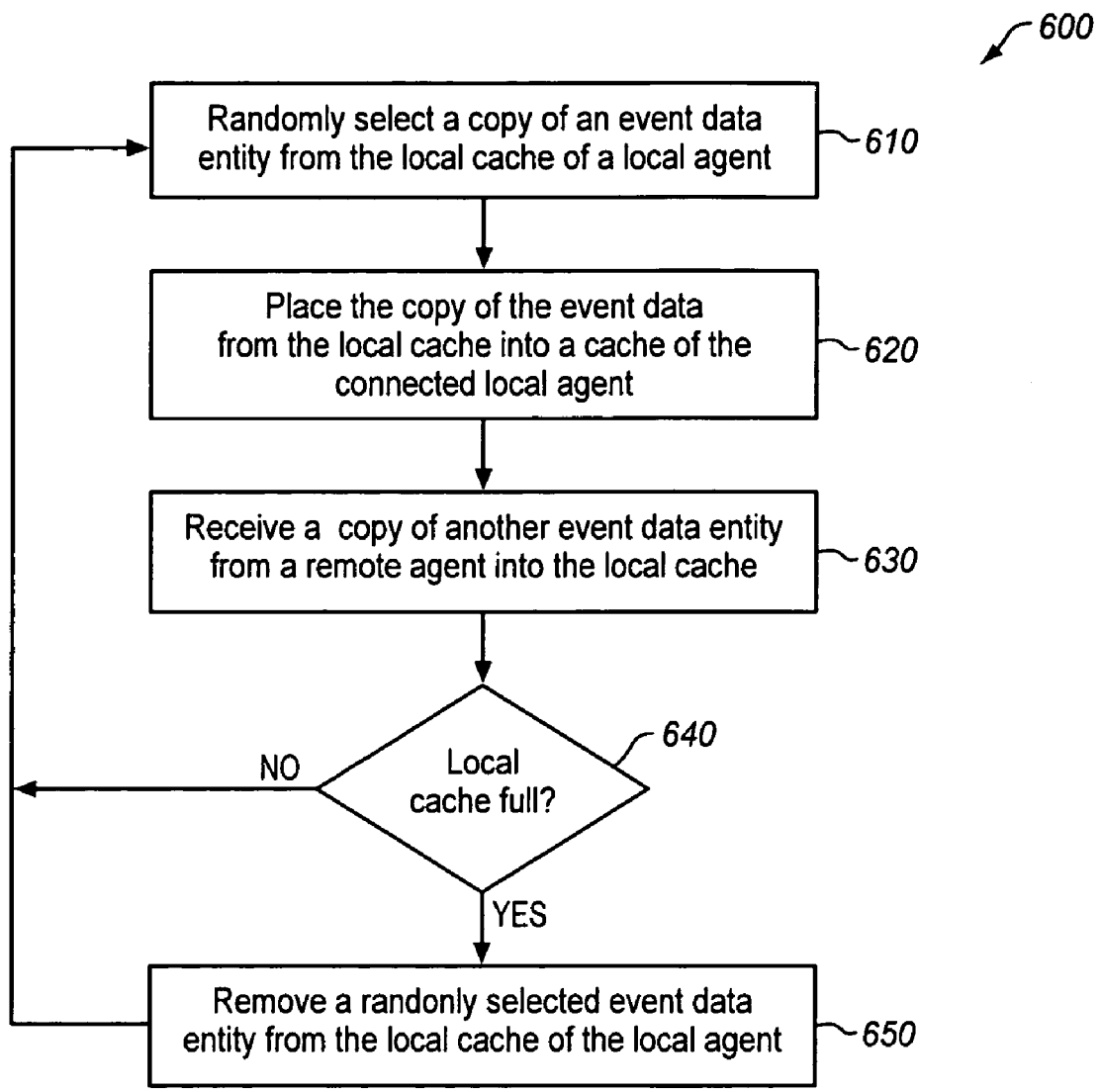
FIG. 6 is a flow diagram depicting a method of data diffusion and evaporation according to an embodiment of the invention.

FIG. 6 is a flow diagram depicting a method of data diffusion and evaporation according to embodiments of the invention. In some embodiments, process 600 is performed by agent 110 or 200 described with respect to FIG. 1 or 2. For instance, process 600 may be performed by diffusion module 212 and evaporation module 216 described with respect to FIG. 2.

Process 600 begins at processing block 610, where a local agent randomly selects a copy of an event data entity from its local cache. Then, at processing block 620, the local agent places the copy of the event data from its local cache into a cache of the connected remote agent. In some embodiments, the local agent may optimize the transfer of the event data by utilizing one or more remote proxy caches at the local agent. In this case, the local agent would cache the copy of the event data into a remote proxy cache that corresponds to a connection with a remote agent. Then, this event data would be swapped across the network in an exchange according to a pre-determined time interval (e.g., every few seconds).

At processing block 630, the local agent receives into its local cache a copy of another event data entity from a remote agent. Then, at decision block 640, the local agent determines whether its local cache has reached a capacity limit. If not, the local agent may continue to perform process 600 beginning at processing block 610. If the local cache is full, then at processing block 650, the local agent randomly selects an event data entity from its local cache to remove. It should be noted that this random selection does not consider the amount of time the event data has been in the local cache or the importance of the event data, it is purely a random selection process. Then, the local agent may continue performing process 600 beginning at processing block 610.

Migration

When an agent of the overall system architecture described above seeks to obtain particular event data of interest from the data management network, it creates a template for the event data it seeks and places it into its local cache. Then, the agent may follow a particular migration process in order to seek out this event data from the data and event management network.

Figure 7:
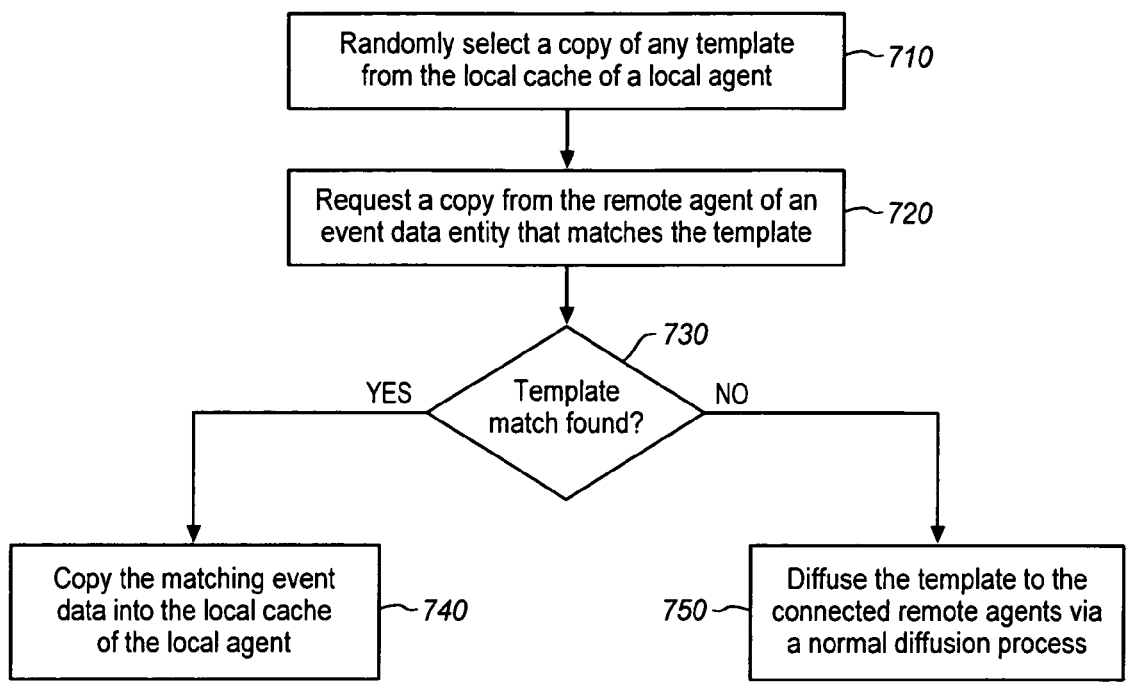
FIG. 7 is a flow diagram depicting a method of data migration according to an embodiment of the invention.

FIG. 7 is a flow diagram depicting one embodiment of a method for this data migration. In some embodiments, process 700 is performed by agent 110 or 200 described with respect to FIG. 1 or 2. For instance, process 700 may be performed by migration module 214 described with respect to FIG. 2.

Process 700 begins at processing block 710, where a local agent randomly selects a copy of any template from its local cache. It may be assumed that the template was previously constructed and placed into the local cache of the local agent. At processing block 720, the local agent requests, from one or more of its randomly connected agents, copies of any matching event data entities for the template. At decision block 730, it is determined whether a template match is found. If so, the local agent places copies the matching event data into its local cache at processing block 740.

However, if no match is found, then the local agent does nothing and allows the templates to diffuse to its connected remote agents via the normal data diffusion process at processing block 750. In one embodiment, this normal data diffusion process is process 600 described with respect to FIG. 6. In some embodiments, the local agent may actively copy the template to the remote agent's cache instead of waiting for the template to diffuse via the normal data diffusion process.

According to process 700, when an agent of the network has an event data match for the template, the local agent that last sent the template to the agent copies this event data into its local cache. In this way, the data follows, in an inverse direction, the path of the template in individual exchanges of template-for-event data until the event data reaches the requesting agent. Accordingly, each agent only has to follow the simple rule of copying the matching event data into its local cache, rather than having to track the original requesting agent throughout the network (local knowledge vs. global knowledge).

Figure 8:
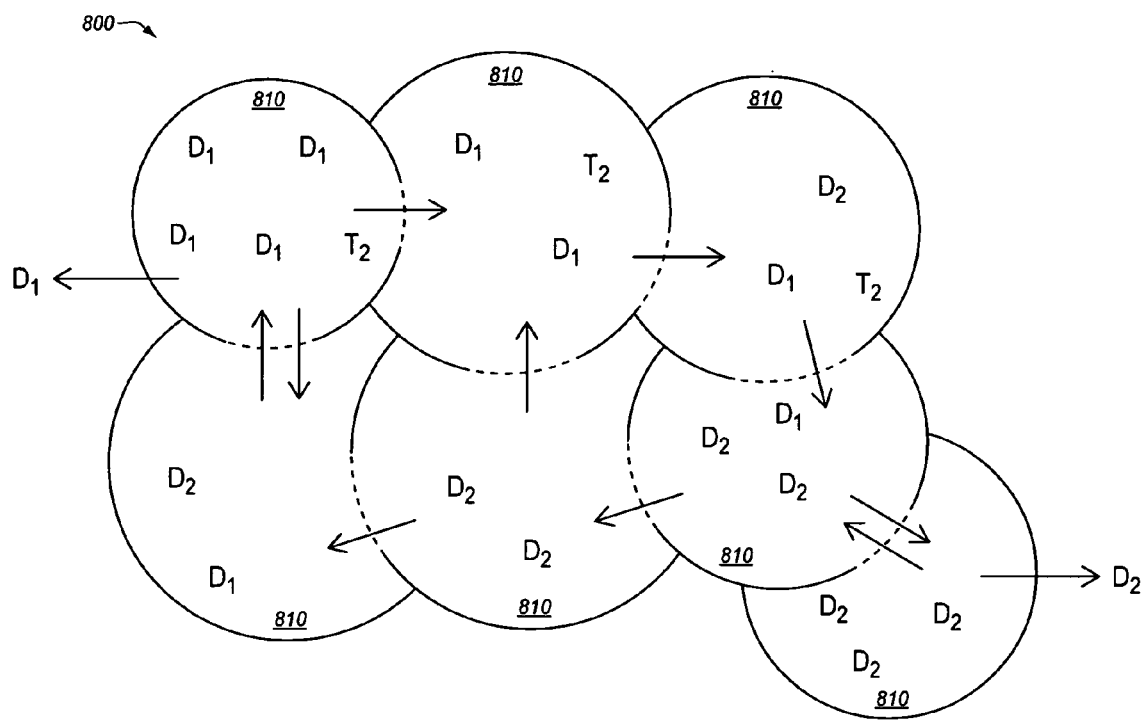
FIG. 8 is a block diagram depicting a data diffusion, evaporation, and migration process in a data and event management network according to an embodiment of the invention.

FIG. 8 is a block diagram depicting data diffusion, evaporation, and migration processes in a data and event management network according to embodiments of the invention. In some embodiments, system 800 may be a data and event management network described with respect to various embodiments of the invention. The system 800 includes multiple agents 810. In one embodiment, agents 810 are the same as agents 110 and 200 described with respect to FIGS. 1 and 2.

As illustrated, agents 810 are depicted as interconnected "bubbles". Each agent 810 is a provider of multiple connections to other agents in the system 800, as well as a recipient of connections from other agents 810. The connections between agents 810 are represented by the dashed lines. An agent 810 may provide event data (e.g., D1 or D2) from its local cache to other agents. An agent 810 may also receive event data (e.g., D1 or D2) from other agents' local caches. Similarly, an agent 810 may create a template (e.g., T2) to actively find certain event data in system 800. In one embodiment, the event data and templates may be transmitted among agents 810 according to processes 600 and 700 described with respect to FIGS. 6 and 7.

By analogy, when the event data (D1 and/or D2) moves according to process 600, it is like a gas molecule in the bubble, randomly moving from one bubble to the next through the various openings between the bubbles. In this way, the event data is able to diffuse throughout the system 800 to multiple agents, with multiple copies of the event data maintained in the system. For instance, event data D1 may initially be concentrated in an agent 810 on side of the system 800, while event data D2 may be concentrated in another agent 810 on another side of the network. This event data D1 and D2 is diffused out into the network to eventually be possibly copied into all of the agents.

In addition, as each local cache reaches its capacity, the agent randomly selects event data to be evaporated (i.e., deleted) from the local cache in order to make room for new event data. As illustrated, event data D1 is shown being evaporated from one agent 810, while event data D2 is being evaporated from another agent to make room for more event data in those agents 810.

Furthermore, an agent 810 may create a template T2 to search out event data D2, for example. As illustrated, T2 may start in the agent 810 with only copies of event data D1. This template may diffuse out into the network according to a normal data diffusion process causing the event data D2 to migrate towards the template-originating agent 810.

Figure 9:
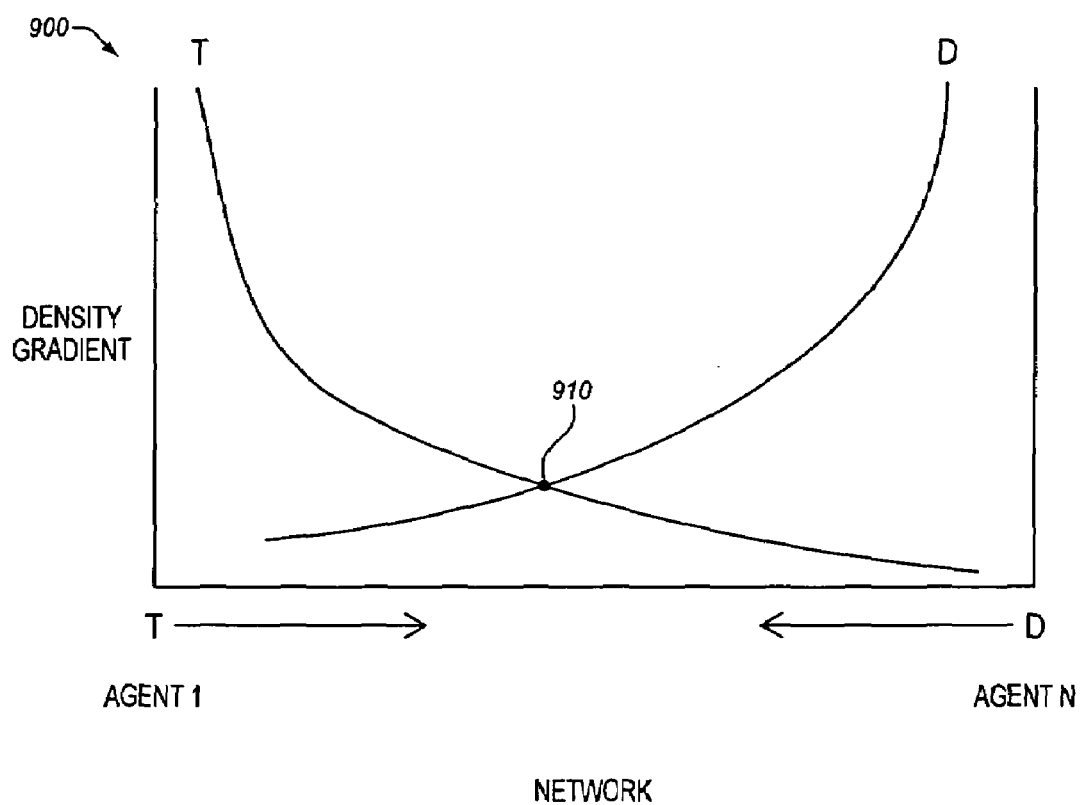
FIG. 9 is a graph depicting a density gradient in a data and event management network of an embodiment of the invention.

FIG. 9 is a graph depicting a density gradient in a data management network resulting from the data migration processes of embodiments of the invention. In one embodiment, the data migration process is the same as process 700 described with respect to FIG. 7. If it is assumed that constant connections are maintained in a network, then the event data will migrate towards templates in the network and eventually meet a template so that the event data may be copied back to the requesting agent.

For example, in a system such as system 800 described with respect to FIG. 8, there are may be copies of templates T2 at a single agent 810 on one side of the network, and many copies of event data D2 at another single agent 810 on another side of the network. Utilizing the data diffusion and evaporation techniques of embodiments of the invention, template T2 and event data D2 will disperse towards other agents 810 throughout the network. Over time, the template T and event data D2 would eventually meet so that a matching copy of the event data could be sent back to the agent 810 originating the template T2 in system 800.

Graph 900 illustrates this density gradient of template T and event data D. The templates T of agent 1 travel from left to right, while the event data D of agent N travels from right to left. The horizontal axis of graph 900 generally indicates dispersion of the template or event data throughout the network. The density gradient increases from bottom to top. As illustrated, the density of both of template T and event data D steeply decreases as it is initially diffused and then gradually levels off for an even distribution throughout the network. The density gradients of template T and event data D reach a point 910 in the graph where they intersect and their density gradients are equal, indicating the point in the network with the template locates the matching event data. Such a point 910 represents even distribution of the template T and event data D throughout a data and event management network.

In summary, for very large scale system management networks, the data and event management network of embodiments of the invention is simple to implement and resilient to changes in network configuration and crashes. Because event data is diffusing through the network across random connections between agents, the event data diffuses around problem areas automatically. Furthermore, as event data is not stored centrally, it should not be lost if a disk, system, or even a subnetwork crashes. In addition, the data migration process allows interesting event data to migrate toward the agents that are interested in it and allows the interesting event data to stay in the system while the uninteresting event data "evaporates" away.

Figure 10:
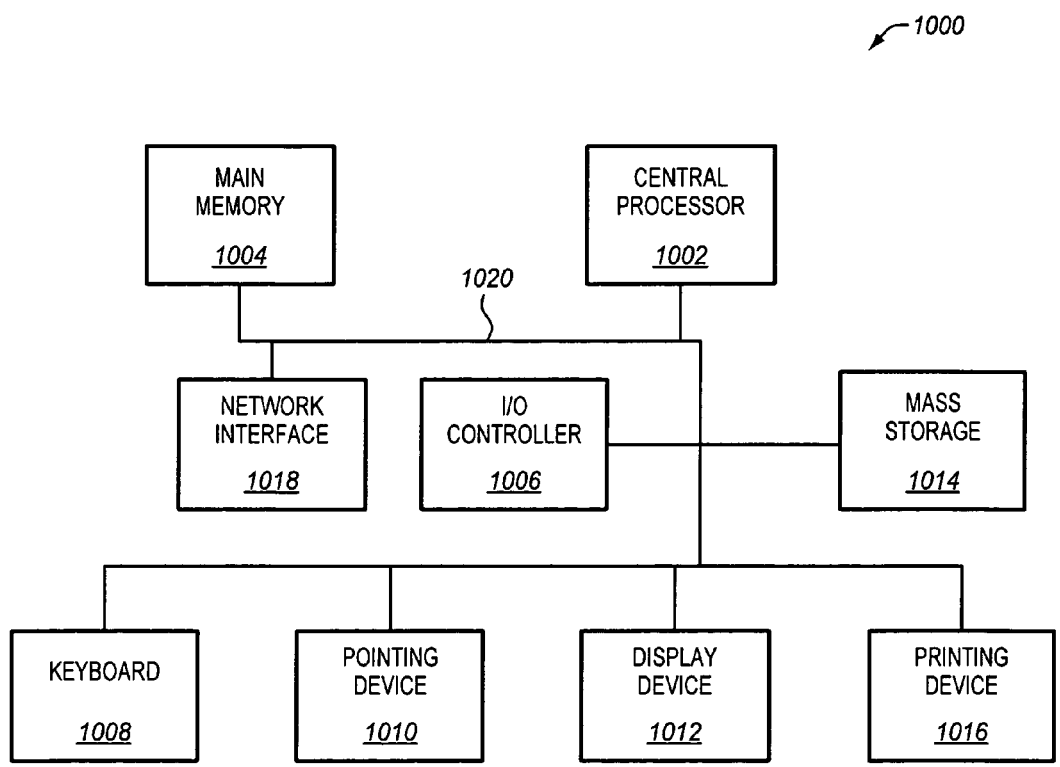
FIG. 10 is an illustration of an embodiment of a computer system.

FIG. 10 illustrates an exemplary computer system 1000 in which certain embodiments of the present invention may be implemented. In one embodiment, the components of FIG. 1 or 2 may be implemented as system 1000 or as components of system 1000.

System 1000 comprises a central processor 1002, a main memory 1004, an input/output (I/O) controller 1006, a keyboard 1008, a pointing device 1010 (e.g., mouse, track ball, pen device, or the like), a display device 1012, a mass storage 1014 (e.g., a nonvolatile storage such as a hard disk, an optical drive, and the like), and a network interface 1018. Additional input/output devices, such as a printing device 1016, may be included in the system 1000 as desired. As illustrated, the various components of the system 1000 communicate through a system bus 1020 or similar architecture.

In a further embodiment, system 1000 may be a distributed computing system. In other words, one or more of the various components of the system 1000 may be located in a physically separate location than the other components of the system 1000. Such components may be accessed and connected via a network to the other components In accordance with an embodiment of the present invention, the computer system 1000 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 1002 may be a complex instruction set computer (CISC) microprocessor, a reduced instruction set computing (RISC) microprocessor, a very long instruction word (VLIW) microprocessor, a processor implementing a combination of instruction sets, and the like.

The network interface 1018 provides communication capability with other computer systems on a same local network, on a different network connected via modems and the like to the present network, or to other computers across the Internet. In various embodiments of the present invention, the network interface 1018 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 1000 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 1000 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
creating connections to transmit event data between a local agent and remote agents randomly selected from a plurality of remote agents in an electronic data management network, the local agent and the plurality of remote agents being configured to maintain the event data for the electronic data management network without utilizing a central management system;
accessing a configuration file at the local agent during initialization of the local agent, the configuration file including address information for the plurality of remote agents to enable the local agent to create the connections;
randomly removing one of the connections between the local agent and the randomly selected remote agents;
forming another connection between the local agent and another randomly selected remote agent; and
seeding the local agent with address information pertaining to a predetermined number of well-known agents of the plurality of remote agents upon the initialization of the local agent to initiate creating connections in the event the configuration file is not present.

2. The method of claim 1 wherein seeding the local agent further comprises:
randomly selecting, within the local agent, address information for a first well-known agent of the predetermined number of well-known agents;
attempting to form a connection between the local agent and the first well-known agent with the address information for the first well-known agent; and
determining whether a first connection is formed successfully between the local agent and the first well-known agent.

3. The method of claim 2 further comprising storing address information pertaining to the local agent in a local cache of the first well-known agent to enable data transfer between the local agent and the first well-known agent in the event the first connection is formed successfully therebetween.

4. The method of claim 3 further comprising randomly selecting, within the local agent, address information for another one of the well-known agents, irrespective of whether the first connection can be formed successfully between the local agent and the first well-known agent, to determine if a second connection can be successfully created between the local agent and the another one of the well-known agents.

5. The method of 1 further comprising inserting a template into a local cache of the local agent, wherein the template corresponds to event data that may be present in at least one of the plurality of remote agents and is of interest to the local agent.

6. The method of claim 5 further comprising requesting, from at least one of the randomly selected remote agents connected to the local agent, event data that matches the template.

7. The method of claim 6 further comprising receiving, at the local agent, from the at least one of the randomly selected remote agents, the matching event data and inserting the matching event data in the local cache of the local agent.

8. A computer program product having a tangible computer-readable medium including computer program logic instructions encoded thereon that, when performed on an electronic device provides a method for performing the operations of:
creating connections to transmit event data between a local agent and remote agents randomly selected from a plurality of remote agents in an electronic data management network, the local agent and the plurality of remote agents being configured to maintain the event data for the electronic data management network without utilizing a central management system;
accessing a configuration file at the local agent during initialization of the local agent, the configuration file including address information for the plurality of remote agents to enable the local agent to create the connections;
randomly removing one of the connections between the local agent and the randomly selected remote agents;
forming another connection between the local agent and another randomly selected remote agent; and
seeding the local agent with address information pertaining to a predetermined number of well-known agents of the plurality of remote agents upon the initialization of the local agent to initiate creating connections in the event the configuration file is not detected.

9. An apparatus, comprising:
a local agent including a local cache;
a plurality of remote agents, wherein the local agent and the plurality of remote agents are configured to maintain event data for an electronic data management network without having to utilize a central management system;
a data diffusion engine operably coupled to the local cache to:
create connections between the local agent and remote agents randomly selected from the plurality of remote agents to transmit the event data between the local agent and the randomly selected remote agents in the electronic data management network;
randomly remove one of the connections between the local agent and the randomly selected remote agents; and
form another connection between the local agent and another randomly selected remote agent;
wherein the local agent retrieves address information for the randomly selected remote agents from a configuration file during initialization of the local agent to create the connections between the local agent and the randomly selected remote agents; and
wherein the local cache of the local agent is seeded with address information for a predetermined number of well-known agents of the plurality of remote agents upon the initialization of the local agent to initiate creating connections in the event the configuration file is not detected.

10. The apparatus of claim 9 wherein the local agent randomly selects address information for a first well-known agent of the predetermined number of well-known agents and attempts to form a connection between the local agent and the first well-known agent with the address information for the first well-known agent; and wherein a determination is made as to whether a first connection is formed successfully between the local agent and the first well-known agent.

11. The apparatus of claim 10 wherein the first well-known agent includes a local cache to store address information pertaining to the local agent for enabling data transfer between the local agent and the first well-known agent in the event the first connection is formed successfully between the local agent and the first well-known agent.

12. The apparatus of claim 11 wherein the local agent randomly selects address information for another one of the well-known agents, irrespective of whether the first connection can be formed successfully between the local agent and the first well-known agent, to determine if a second connection can be successfully created between the local agent and the another one of the well-known agents.

13. The apparatus of claim 9 wherein the local cache of the local agent includes a template that corresponds to event data that may be present in at least one of the plurality of remote agents and is of interest to the local agent.

14. The apparatus of claim 13 wherein the local agents receives event data matching the template from at least one of the randomly selected remote agents connected to the local agent.

* * * * *

UNITED STATES PATENT AND TRADEMARK OFFICE
CERTIFICATE OF CORRECTION

PATENT NO. : 7,701,946 B1
APPLICATION NO. : 11/499157
DATED : April 20, 2010
INVENTOR(S) : Derk D. Norton et al.

It is certified that error appears in the above-identified patent and that said Letters Patent is hereby corrected as shown below:

On the Title page, item (73), in "Assignee", line 1, delete "Shore," and insert -- Shores, --, therefor.

On sheet 6 of 10, in Figure 10, Box 650, line 1, delete "randonly" and insert -- randomly --, therefor.

In column 5, line 44, delete "agents" and insert -- agent --, therefor.

In column 9, line 58, after "components" insert -- . --.

In column 11, line 53, in claim 5, delete "1" and insert -- claim 1 --, therefor.

In column 14, line 3, in claim 14, delete "agents" and insert -- agent --, therefor.

Signed and Sealed this
Twelfth Day of April, 2011

David J. Kappos
*Director of the United States Patent and Trademark Office*